United States Patent
Wang et al.

(10) Patent No.: US 9,465,255 B2
(45) Date of Patent: Oct. 11, 2016

(54) RUBBING CLOTH, ROLLER, METHOD OF FORMING LC ALIGNMENT ANGLE AND METHOD OF CLEANING DEBRIS

(71) Applicants: BOE TECHNOLOGY GROUP CO., LTD., Beijing (CN); BEIJING BOE DISPLAY TECHNOLOGY CO., LTD., Beijing (CN)

(72) Inventors: Yupeng Wang, Beijing (CN); Chao Tian, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/361,569

(22) PCT Filed: Aug. 12, 2013

(86) PCT No.: PCT/CN2013/081247
§ 371 (c)(1),
(2) Date: May 29, 2014

(87) PCT Pub. No.: WO2014/187031
PCT Pub. Date: Nov. 27, 2014

(65) Prior Publication Data
US 2015/0253630 A1 Sep. 10, 2015

(30) Foreign Application Priority Data

May 20, 2013 (CN) .......................... 2013 1 0187956

(51) Int. Cl.
| | | |
|---|---|---|
| G02F 1/1337 | (2006.01) | |
| D06P 1/00 | (2006.01) | |
| D06P 3/60 | (2006.01) | |
| H05F 3/06 | (2006.01) | |

(52) U.S. Cl.
CPC .......... *G02F 1/133784* (2013.01); *D06P 1/00* (2013.01); *G02F 1/133723* (2013.01); *H05F 3/06* (2013.01); *D06P 3/60* (2013.01)

(58) Field of Classification Search
CPC .................. G02F 1/133784; G02F 1/133723; D06P 1/00; D06P 3/60; H05F 3/06
See application file for complete search history.

(56) References Cited

U.S. PATENT DOCUMENTS

| | | | |
|---|---|---|---|
| 3,053,843 A | * | 9/1962 | Enrico Knusli et al. ..... 544/194 |
| 2007/0083040 A1 | | 4/2007 | Hasemann |
| 2012/0138133 A1 | | 6/2012 | Wang et al. |
| 2012/0291207 A1 | | 11/2012 | Desai et al. |

FOREIGN PATENT DOCUMENTS

| | | | |
|---|---|---|---|
| CN | 1890329 | A | 1/2007 |
| CN | 201266289 | Y | 7/2009 |
| CN | 101725040 | A | 6/2010 |
| CN | 102243393 | A | 11/2011 |
| CN | 102251333 | A | 11/2011 |
| CN | 201010172146 | * | 11/2011 |
| CN | 202222848 | U | 5/2012 |
| CN | 202225848 | U | 5/2012 |
| CN | 202448613 | U | 9/2012 |
| CN | 102782210 | A | 11/2012 |
| WO | 2011/003280 | A1 | 1/2011 |

OTHER PUBLICATIONS

Written Opinion of the International Searching Authority dated Feb. 7, 2014; PCT/CN2013/081247.
First Chinese Office Action Appln. No. 201310187956.2; Dated Feb. 28, 2015.
Second Chinese Office Action Appln. No. 201310187956.2; Dated Apr. 10, 2015.
Korean Office Action Appln. No. 10-2014-7016542; Dated May 6, 2015.
Chinese Office Action Appln. No. 201310187956.2; Dated Jul. 10, 2015.
Fourth Chinese Office Action dated Dec. 14, 2015; Appln. No. 201310187956.2.
Korean Office Action dated Jan. 4, 2016; Appln. No. 10-2014-7016542.

* cited by examiner

*Primary Examiner* — Amina Khan
(74) *Attorney, Agent, or Firm* — Ladas & Parry LLP

(57) ABSTRACT

A rubbing cloth, a roller, a method of forming an LC alignment angle and a method of cleaning debris are provided. The rubbing cloth is dyed by using a solution dissolved with a dye containing at least one of hydroxyl group and cyano-group. An outer surface of the roller is provided with the rubbing cloth. The method of forming the LC alignment angle forms the LC alignment angle by using a roller with an outer surface wrapped by the rubbing cloth of the present invention. The method of cleaning debris cleans debris by using the rubbing cloth or the roller under illumination condition. They present advantages of excellent cleaning effect, simple implementation and low cost.

18 Claims, 2 Drawing Sheets

RUBBING CLOTH, ROLLER, METHOD OF FORMING LC ALIGNMENT ANGLE AND METHOD OF CLEANING DEBRIS

TECHNICAL FIELD

Embodiments of the present invention relate to a rubbing cloth, a roller, a method of forming LC alignment angle, and a method of cleaning debris.

BACKGROUND

During the manufacture process of a liquid crystal (LC) panel, it needs to form alignment films on both of an array substrate and a color filter substrate for pre-alignment of LC. The process of forming an alignment film usually comprises: firstly applying a polyimide (PI) liquid onto a substrate uniformly to form a PI layer, and then rubbing the PI layer by a roller so as to form an alignment angle or alignment channel in the PI layer as required.

This rubbing process may produce a lot of debris which are different in their dimensions, such as those falling from the PI layer. Conventional debris-removing processes mainly emphasize on the cleaning of the array substrate and the color filter substrate, although it belongs to a mature technology, it easily involves following problems.

First, it's difficult to thoroughly remove the relatively tiny debris in terms of the conventional cleaning manners, thus the working efficiency is low.

Secondly, if the cleaning is not performed thoroughly, the assembled display panel will involve display failure.

Thirdly, the implementation is complicated and also expensive.

SUMMARY

Embodiments of the present invention provide a rubbing cloth, a roller, a method of forming alignment angle and a method of cleaning debris, which can obtain excellent cleaning effect, and are simple and inexpensive for implementation.

According to an aspect of the present invention, a rubbing cloth is provided. The rubbing cloth is dyed by using a solution dissolved with a dye containing at least one of hydroxyl group and cyano-group.

According to an embodiment of the present invention, the dye can be one or more of:
2-cyano-3-{6-{4-[N,N-bis(4-hexyloxyphenyl)amino]phenyl}-4,4-dihexyl-4H-dithienyl [2,1-b:3,4-b'] pentalene} acrylic acid,
2-cyano-3-{N-hexyl-{4-[N,N-bis(4-hexyloxyphenyl) amino]phenyl}-dithienyl[3,2-b:2,3'-d]pyrrole} acrylic acid, and
2-cyano-3-{6-{4-[N,N-bis(4-hexyloxyphenyl)amino]phenyl}-4,4-dihexyl-4H-dithienyl [2,1-b:3,4-b']silole} acrylic acid.

According to an embodiment of the present invention, a solvent for dissolving said dye is chloroform and/or ethanol.

According to an embodiment of the present invention, a material of the rubbing cloth is cotton.

According to another aspect of the present invention, a roller is provided. An outer surface of the roller is provided with the above-mentioned rubbing cloth.

According to an embodiment of the present invention, the roller is a roller of forming an LC alignment angle.

According to another aspect of the present invention, a method of forming an LC alignment angle is provided, which comprises forming the LC alignment angle by using the above-mentioned roller.

According to an embodiment of the present invention, the method comprises: applying a polyimide (PI) liquid onto a substrate uniformly to form a PI layer; and rolling the roller on the PI layer for rubbing the PI layer according to a predetermined LC alignment under illumination to form the LC alignment angle.

According to an embodiment of the present invention, the method further comprises eliminating static remaining on the substrate.

According to an embodiment of the present invention, the static remaining on the substrate can be eliminated by ionizing air.

According to yet another aspect of the present invention, a method of cleaning debris is provided. The method cleans debris by using the rubbing cloth or using the roller under illumination.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

Figure 1:
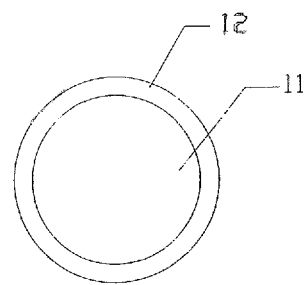
FIG. 1 is a schematic view illustrating a structure of the roller according to an embodiment of the present invention.

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

The rubbing cloth according to embodiments of the present invention is dyed by using a solution dissolved with a dye containing at least one of hydroxyl group and cyano-group.

Hydroxyl group and cyano-group both are groups having strong adsorption capability for electrons, thus the electrons in carboxyl group and cyano-group subjecting to appropriate illumination pass through a π-conjugated system to reach a state with unstable energy level, thereby initiating an energy level transition which leads to an electric discharge phenomenon and hence electrifies the rubbing cloth. As a result, the rubbing cloth is capable of adsorbing debris by electric charge adsorption phenomenon. The rubbing cloth of the present embodiments not only performs cleaning by rubbing but also performs cleaning by electric charge adsorption, thus it is advantageous in its strong cleaning capability.

During implementation, a dye containing carboxyl group or a dye containing cyano-group or a dye containing both carboxyl group and cyano-group can be utilized for manufacturing the rubbing cloth of the present embodiments. The present embodiments provide exemplary dyes as below.

The dye can be one or more of:
2-cyano-3-{6-{4-[N,N-bis(4-hexyloxyphenyl)amino]phenyl}-4,4-dihexyl-4H-dithienyl [2,1-b:3,4-b'] pentalene}acrylic acid,
2-cyano-3-{N-hexyl-{4-[N,N-bis(4-hexyloxyphenyl) amino]phenyl}-dithienyl[3,2-b:2,3'-d] pyrrole}acrylic acid, and
2-cyano-3-{6-{4-[N,N-bis(4-hexyloxyphenyl)amino]phenyl}-4,4-dihexyl-4H-dithienyl [2,1-b:3,4-b']silole}acrylic acid.

The above-mentioned three types of dyes or a mixture thereof are/is stable and durable in performances, and can be used for manufacturing a durable rubbing cloth with better cleaning and adsorption.

As a further improvement of the present embodiment, a solvent for dissolving the dye can be chloroform and/or ethanol. The dye is a kind of organic substance, and an organic substance is selected for dissolving it according to similarity-intermiscibility theory. For example, chloroform and/or ethanol are selected as the solvent due to its high dissolvability for a dye containing carboxyl group and/or cyano-group. Dissolving the dye by using chloroform or ethanol allows a larger mass content of dye to be dissolved in the solution, and hence a rubbing cloth with an even stronger adsorption capability can be manufactured, especially when the dye is one or more of:
2-cyano-3-{6-{4-[N,N-bis(4-hexyloxyphenyl)amino]phenyl}-4,4-dihexyl-4H-dithienyl [2,1-b:3,4-b'] pentalene}acrylic acid,
2-cyano-3-{N-hexyl-{4-[N,N-bis(4-hexyloxyphenyl) amino]phenyl}-dithienyl[3,2-b:2,3'-d] pyrrole}acrylic acid, and
2-cyano-3-{6-{4-[N,N-bis(4-hexyloxyphenyl)amino]phenyl}-4,4-dihexyl-4H-dithienyl [2,1-b:3,4-b']silole}acrylic acid.

In an illustrative implementation, the rubbing cloth can be made from cloth materials such as nylon and fiber. For example, cotton cloth is selected for use in the present embodiment. The cotton cloth exhibits stronger adsorption affinity for a dye with functional groups including carboxyl group and/or cyano-group, thus the rubbing cloth of the present embodiment that is made from cotton cloth presents an even stronger adsorptive capability.

As described, the rubbing cloth of the present embodiment is advantageous in simple manufacture, low cost and excellent cleaning effect, etc.

An outer surface of the roller according to embodiments of the present invention is provided with above-described rubbing cloth. Referring to FIG. 1, the outer surface of the roller 11 is covered with a rubbing cloth 12 which is formed by dyeing with a dye solution containing carboxyl group and/or cyano-group. When the roller 11 is used in cleaning an object, in addition to remove dirt on the object by rubbing, it can adsorb debris from the rubbing cloth 12 by adsorption capability generated under illumination. Furthermore, it presents better adsorption capability for tiny debris.

Figure 2:
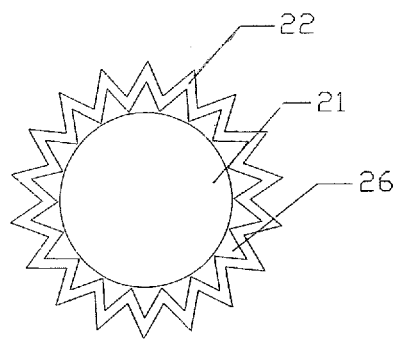
FIG. 2 is another schematic view illustrating a structure of the roller according to an embodiment of the present invention.

As a further improvement of the present embodiment, the roller 21 is a roller for forming an LC alignment angle, as shown in FIG. 2. An outer surface of the roller for forming the LC alignment angle is provided with a texture 26 for forming the LC alignment angle. The rubbing cloth 22 is applied on a surface of the texture 26 and abutted against the texture 26 for forming the LC alignment angle, so that the LC alignment angle is formed by the roller, while it generates an adsorption affinity for electric charges under illumination to adsorb tiny debris. Furthermore, the amount of electric charges generated by the dye on the rubbing cloth is relatively small, thus these electric charges will not influence the internal circuit of the array substrate or color filter substrate. In addition, such kind of electric charge is stable in dimension and easy for control.

The method of forming an alignment angle according to embodiments of the present invention comprises forming the LC alignment angle by using the above-described roller.

Figure 3:
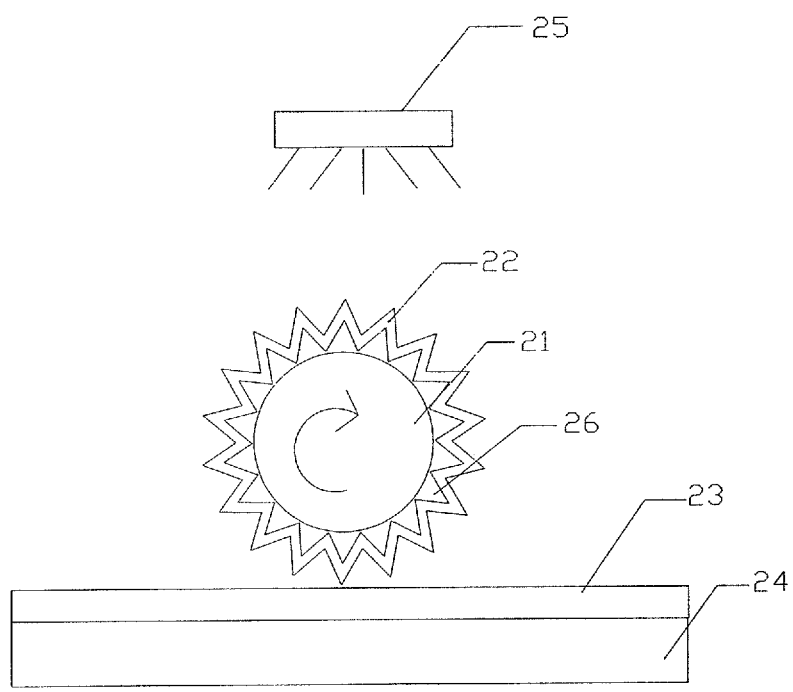
FIG. 3 is a schematic view illustrating a method of forming an LC alignment angle according to an embodiment of the present invention.
Figure 4:
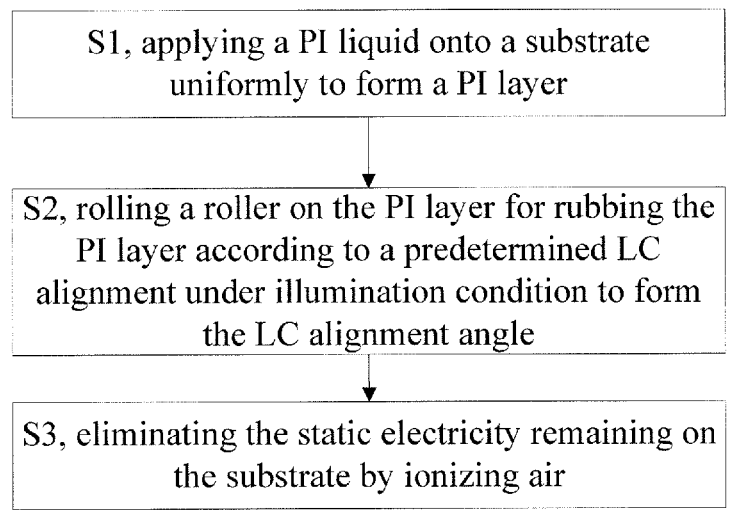
FIG. 4 is a flow chart illustrating a method of forming an LC alignment angle according to an embodiment of the present invention.

As shown in FIGS. 3-4, for further improving the present embodiment, the method of forming the alignment angle comprises the following steps.

Step S1, a Polyimide (PI) liquid is applied onto a substrate 24 uniformly to form a PI layer 23. The substrate is an array substrate, or can be a color filter substrate, for example.

Step S2, the roller 21 is rolled on the PI layer 23 for rubbing the PI layer 23 according to a predetermined LC alignment under illumination condition to form the LC alignment angle. The numeral reference 25 in the Drawings indicates a light source for establishing the illumination condition. The roller 21 is enwrapped with the rubbing cloth 22 according to embodiments of the present invention. A texture 26 for forming the LC alignment angle is disposed beneath the rubbing cloth 22, and the rubbing cloth 22 is abutted against the texture 26.

In this way, while the LC alignment angle is formed, the debris are removed by rubbing with the rubbing cloth and by adsorption affinity for electric charges. That is, two tasks are completed in one single step, which decreases the numbers of process steps, thus it is simple for implementation. Apart from the above-described advantages, embodiments of the present invention are also excellent in cleaning effect which is especially significant for removing tiny debris, as compared with the conventional manner by washing.

Discharge happens when the roller is illuminated, which may result in remaining part of electric charges on the substrate. In order to eliminate the above-described electric charges, the method can comprise another step S3 of eliminating static electricity, as a further improvement of the present embodiment. The step S3 of eliminating static electricity can be performed by, for example, static electricity elimination method based on ionizing air. The static electricity elimination method based on ionizing air is to eliminate the static electricity by utilizing neutralization effect of the ionizing air, for example, it usually utilizes negative ionizing air.

During implementation, the quantity of electric charges released by the rubbing cloth according to embodiments of the present invention is not much, thus there is hardly any interruption or damage to the circuits on the array substrate or color filter substrate. Moreover, through step S3, static electricity that nearly has no destructive power is further eliminated, which allows better quality of the produced product.

During implementation, the process of forming LC alignment angle can remain unchanged, and it merely needs to use the rubbing cloth and the roller according to the present invention for performing cleaning at the phase of cleaning debris. As compared with conventional cleaning methods, such implementation is also advantageous in the excellent cleaning effect.

In the method of cleaning debris according to embodiments of the present invention, the rubbing cloth or roller of the present invention is utilized in cleaning debris under illumination condition. For example, the method of cleaning debris according to the present embodiment can be used in cleaning debris after the LC alignment angle is formed by a conventional method.

In the method of cleaning debris according to embodiments of the present invention, the rubbing cloth and the roller of the present invention are utilized in cleaning, which provides multiple advantages, such as excellent cleaning effect, simple and quick implementation, and low cost.

The rubbing cloth, the roller, the method of forming the LC alignment angle and the method of cleaning debris according to embodiments of the present invention can provide beneficial effects as below.

Firstly, the rubbing cloth, the roller, the method of forming the LC alignment angle and method of cleaning debris according to embodiments of the present invention involve dyeing the rubbing cloth by using a solution dissolved with a dye containing carboxyl group and/or cyano-group. Since the carboxyl group and/or cyano-group both are groups with strong adsorption capability for electrons, they will initiate an energy level transition under illumination to generate static electricity, and debris are removed by electrostatic adherence phenomenon. Therefore, they have advantages of excellent adsorption effect and cleaning effect.

Secondly, when utilized in a method of forming an LC alignment angle, the rubbing cloth, the roller and the method of forming the LC alignment angle according to embodiments of the present invention involve synchronously performing the step of forming the LC alignment angle and the step of cleaning debris generated during the forming process in one single step, thus a subsequent cleaning step is eliminated. In this way, as compared with a conventional process, it has advantages of fewer process steps, higher manufacture efficiency and lower manufacture cost. Furthermore, after the LC alignment angle is formed, the method of cleaning debris according to embodiments of the present invention can be utilized in cleaning the debris as a replacement of a conventional washing method, which also provides advantages of simple and quick implementation, low cost, excellent effect and high efficiency.

It is understood that the described above are just exemplary implementations and embodiments to explain the present invention, and it is not intended to limit the present invention. An ordinary person in the art can make various variations and modifications to the present invention without departure from the spirit and the scope of the present invention, and such variations, modifications and their equivalents shall fall in the scope of the present invention. The scope of the present invention is defined by the claims.

What is claimed is:

1. A rubbing cloth-comprising:
   a cloth material; and
   a dye composition in the cloth material that comprises 2-cyano-3-{6-{4-[N,N-bis(4-hexyloxyphenyl)amino]phenyl}-4,4-dihexyl-4H-dithienyl [2,1-b:3,4-b'] pentalene} acrylic acid.

2. The rubbing cloth according to claim 1, wherein the dye composition further comprises:
   2-cyano-3-{N-hexyl-{4-[N,N-bis(4-hexyloxyphenyl)amino]phenyl}-dithienyl[3,2-b:2,3'-d] pyrrole}acrylic acid.

3. The rubbing cloth according to claim 1, wherein the dye composition is dissolved in a solvent of chloroform and/or ethanol.

4. The rubbing cloth according to claim 1, wherein the cloth material of said rubbing cloth is cotton.

5. The rubbing cloth according to claim 3, wherein the solvent comprises chloroform.

6. The rubbing cloth according to claim 3, wherein the solvent comprises ethanol.

7. The rubbing cloth according to claim 1, wherein the dye composition further comprises 2-cyano-3-{6-{4-[N,N-bis(4-hexyloxyphenyl)amino]phenyl}-4,4-dihexyl-4H-dithienyl [2,1-b:3,4-b']silole} acrylic acid.

8. A roller, comprising the rubbing cloth according to claim 1 on an outer surface of the roller.

9. The roller according to claim 8, wherein said roller is a roller configured to form an LC alignment angle.

10. A rubbing cloth comprising:
    a cloth material;
    a solvent in the cloth material; and
    a dye composition dissolved in the solvent, wherein the dye composition comprises a dye selected from the group consisting of:
    2-cyano-3-{6-{4-[N,N-bis(4-hexyloxyphenyl)amino]phenyl}-4,4-dihexyl-4H-dithienyl [2,1-b:3,4-b'] pentalene} acrylic acid,
    2-cyano-3-{N-hexyl-{4-[N,N-bis(4-hexyloxyphenyl)amino]phenyl}-dithienyl[3,2-b:2,3'-d] pyrrole} acrylic acid, and
    2-cyano-3-{6-{4-[N,N-bis(4-hexyloxyphenyl)amino]phenyl}-4,4-dihexyl-4H-dithienyl [2,1-b:3,4-b']silole} acrylic acid.

11. The rubbing cloth of claim 10, wherein the solvent is selected from the group consisting of ethanol and chloroform.

12. The rubbing cloth of claim 10, wherein the cloth material comprises cotton.

13. The rubbing cloth of claim 1, wherein the dye composition further comprises 2-cyano-3-{6-{4-[N,N-bis(4-hexyloxyphenyl)amino]phenyl}-4,4-dihexyl-4H-dithienyl [2,1-b:3,4-b']silole} acrylic acid.

14. A roller, comprising the rubbing cloth according to claim 10 on an outer surface of the roller.

15. A method of forming a liquid crystal (LC) alignment angle, comprising:
    forming said LC alignment angle by using a roller, wherein the roller comprising the rubbing cloth according to claim 1 on an outer surface of the roller.

16. The method of forming the LC alignment angle according to claim 15, comprising:
    applying a polyimide (PI) liquid onto a substrate uniformly to form a PI layer; and
    rolling said roller on the PI layer for rubbing the PI layer according to a predetermined LC alignment under illumination condition to form said LC alignment angle.

17. The method of forming the LC alignment angle according to claim 16, further comprising:
    eliminating static electricity remaining on the substrate.

18. The method of forming the LC alignment angle according to claim 17, wherein the static electricity remaining on the substrate is eliminated by ionizing air.

* * * * *